United States Patent [19]

Yamaguchi

[11] Patent Number: 4,637,701
[45] Date of Patent: Jan. 20, 1987

[54] SHUTTER FOR USE IN A TELEVISION CAMERA

[75] Inventor: Yoshihisa Yamaguchi, Tokyo, Japan

[73] Assignee: Yamaguchi Cinema Corporation, Tokyo, Japan

[21] Appl. No.: 865,187

[22] Filed: May 19, 1986

[30] Foreign Application Priority Data

Jun. 18, 1985 [JP] Japan .................................. 60-132407
Jun. 18, 1985 [JP] Japan .................................. 60-92094
Jun. 18, 1985 [JP] Japan .................................. 60-92095

[51] Int. Cl.$^4$ ............................................. G03B 9/10
[52] U.S. Cl. ..................................... 352/218; 352/215
[58] Field of Search ............... 352/218, 216, 214, 215; 358/55

[56] References Cited

U.S. PATENT DOCUMENTS 1,749,154 3/1930 O'Hagen et al. ..................... 352/218
3,196,457 7/1965 Buck ................................... 352/216

FOREIGN PATENT DOCUMENTS 2338 of 1912 United Kingdom ................. 352/218

Primary Examiner—Monroe H. Hayes
Attorney, Agent, or Firm—Kane, Dalsimer, Kane, Sullivan and Kurucz

[57] ABSTRACT

A shutter for use in a television camera, including: a casing having a first wall having a first opening formed therethrough for allowing incident light from a lens of the television camera to pass through the first opening and a second wall opposingly disposed to the first wall and having a second opening aligned to the first opening for allowing the incident light to pass through the second opening into a body of the television camera; a first disc member supported within the casing to be rotatable about an axis thereof and in parallel with the first and the second walls, the first disc member having a first shutter hole formed therethrough; a second disc member supported within the casing to be rotatable about an axis thereof and in parallel with the first and the second walls, the second disc member having a second shutter hole formed therethrough, the first disc member and the second disc member being disposed to overlap at overlapping areas at peripheries thereof with a gap, the first and second shutter holes formed to be aligned to each other and to the first and second openings at the overlapping areas to define a shutter opening when the first and second disc members rotate; a rotating mechanism, mounted on the casing, for rotating the first and the second disc members in the same direction; and a controlling mechanism for controlling the rotating mechanism to thereby control the rotation of the first and the second disc members so that the forming of the shutter opening is synchronized with a field scanning of the television camera, whereby the incident light is allowed to pass through the first opening, the shutter opening and the second opening in synchronism with the field scanning of the television camera.

6 Claims, 9 Drawing Figures

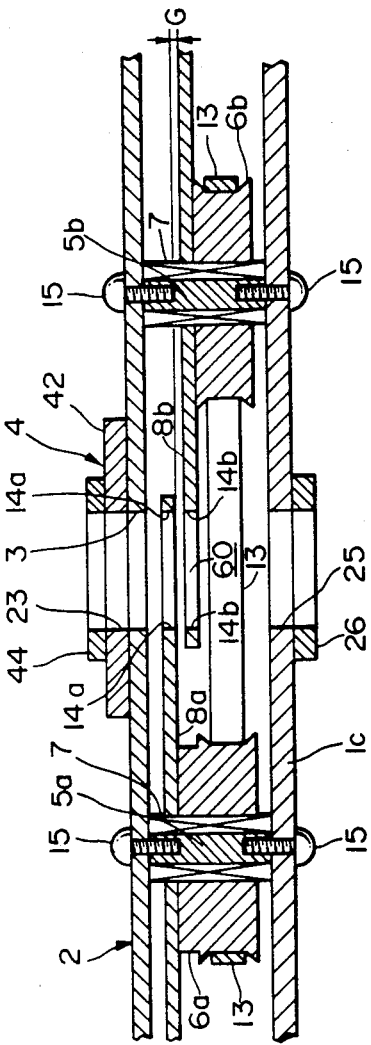
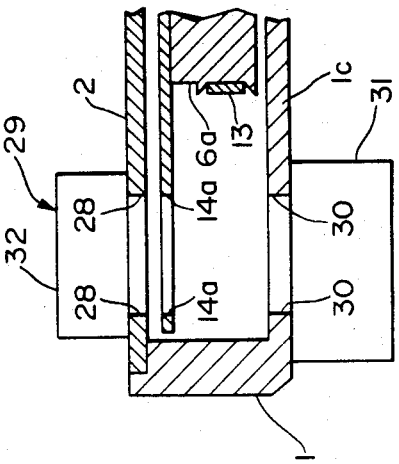
FIG. 4
FIG. 5

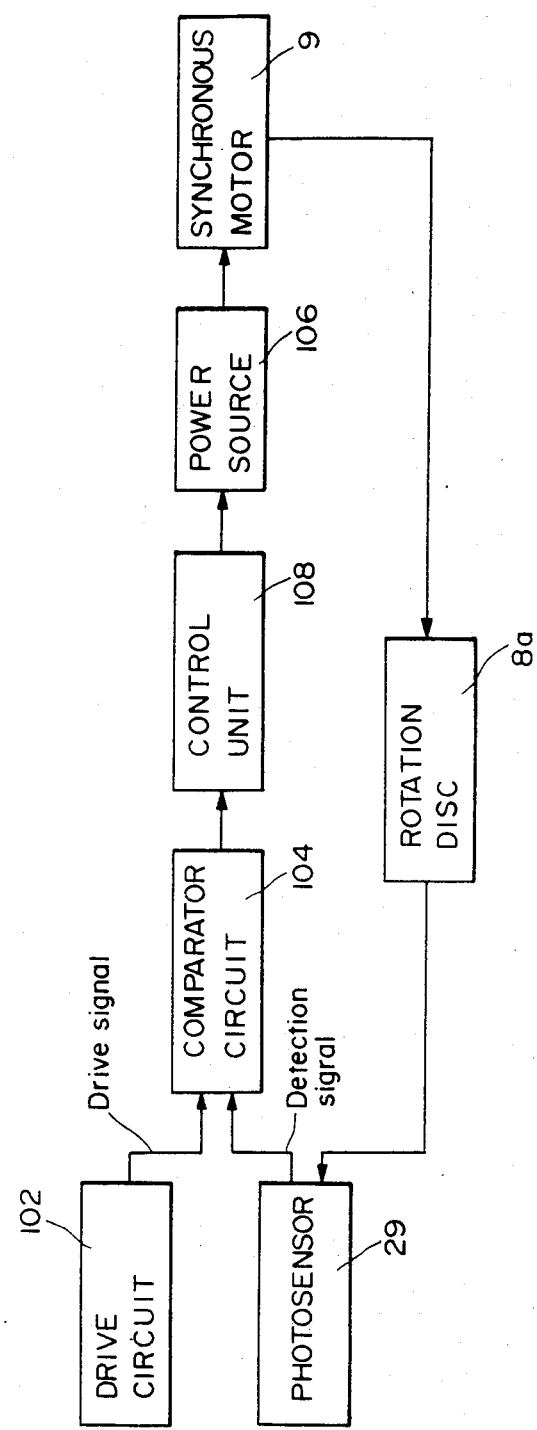

SHUTTER FOR USE IN A TELEVISION CAMERA

BACKGROUND OF THE INVENTION

The present invention relates to a shutter adapted to be attached to a television camera.

Most of currently used television camera tubes are storage-type camera tubes, which produce electric charges at their photoelectric surfaces when light arrives there, and which convert the electric charges to picture signals. After the loss of electric charges at the photoelectric surface by the scanning of one field, the storage-type camera tube electronically stores all incident light, projected on the photoelectric surface, as a picture for the next field until scanning of the next field is commenced. When a picture of a high speed object, such as a horce in race, is shot with a television camera using a camera tube of this kind, the camera tube converts a locus of the object to electric signals since the optical image of the object on the photoelectric surface moves during a time period between the scanning of a field and that of the next. This results in blurring of the object picture and hence details of the object cannot be clearly reproduced.

To overcome this drawback, there has been proposed a television camera shutter which is disposed on an optical axis and which is periodically released at a high speed in synchronism with a vertical drive signal of the television camera. An optical image for each field is projected on the photoelectric surface by every shuttering operation for a very short period of time. Thus, a clear picture is reproduced on a monitor screen by means of a video recorder, field memory, etc. FIG. 1 diagrammatically illustrates a typical example of this prior art shutter, in which two discs 100a and 100b which have each a pair of shutter holes 200a and 200b or 200b and 200b formed through them at intervals of 180°, are concentrically disposed and are rotated in the opposite directions. In this prior art shutter, corresponding shutter holes 200a and 200b of the two discs are designed to be aligned to each other on the optic axis O in synchronism with vertical drive signals of the television camera, thus allowing light to pass through them. However, this prior art shutter is disadvantageous in that the thickness thereof in the optic axis direction is rather large since two discs 100a and 100b are each provided with a drive unit for rotating them in the opposite directions. This results in that focusing of a short focal distance lens can be impossible. Further, the drive units are rather complicated in structure and hence increase weight of the television camera, which is disadvantageous in operation thereof.

SUMMARY OF THE INVENTION

Accordingly, it is an object of the present invention to provide a television camera shutter which is fairly small in its thickness as compared to the prior art shutter and hence enables use of a relatively short focal distance lens.

It is another object of the present invention to provide a shutter for use in a television camera, in which the shutter driving unit is less complicated in structure and hence reduced in weight, resulting in excellent operability of the television camera.

With these and other objects in view, the present invention provides a shutter for use in a television camera, including: a casing having a first wall having a first opening formed therethrough for allowing incident light from a lens of the television camera to pass through the first opening and a second wall opposingly disposed to the first wall and having a second opening aligned to the first opening for allowing the incident light to pass through the second opening into a body of the television camera; a first disc member supported within the casing to be rotatable about an axis thereof and in parallel with the first and the second walls, the first disc member having a first shutter hole formed therethrough; a second disc member supported within the casing to be rotatable about an axis thereof and in parallel with the first and the second walls, the second disc member having a second shutter hole formed therethrough, the first disc member and the second disc member being disposed to overlap at overlapping areas at peripheries thereof with a gap, the first and second shutter holes formed to be aligned to each other and to the first and second openings at the overlapping areas to define a shutter opening when the first and second disc members rotate; a rotating mechanism, mounted on the casing, for rotating the first and the second disc members in the same direction; and a controlling mechanism for controlling the rotating mechanism to thereby control the rotation of the first and the second disc members so that the forming of the shutter opening is synchronized with a field scanning of the television camera, whereby the incident light is allowed to pass through the first opening, the shutter opening and the second opening in synchronism with the field scanning of the television camera.

BRIEF DESCRIPTION OF THE DRAWINGS

The invention will now be described by way of example with reference to the accompanying drawings in which:

FIG. 4 is an enlarged sectional view taken along the line IV—IV in FIG. 2;

FIG. 5 is an enlarged sectional view taken along the line V—V in FIG. 2;

FIG. 7 is a block diagram illustrating control of the synchronous motor;

DETAILED DESCRIPTION OF THE PREFERRED EMBODIMENTS

Figure 1:
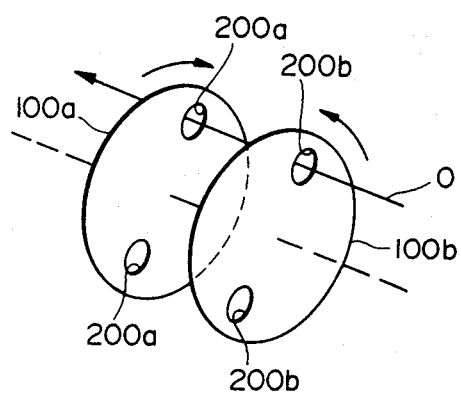
FIG. 1 is a diagrammatic perspective view of the prior art shutter.
Figure 6:
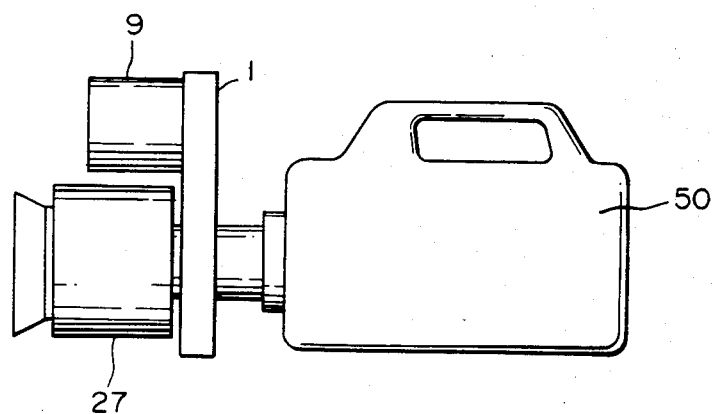
FIG. 6 is a side view in a reduced scale of a television camera with the shutter in FIG. 2.
Figure 2:
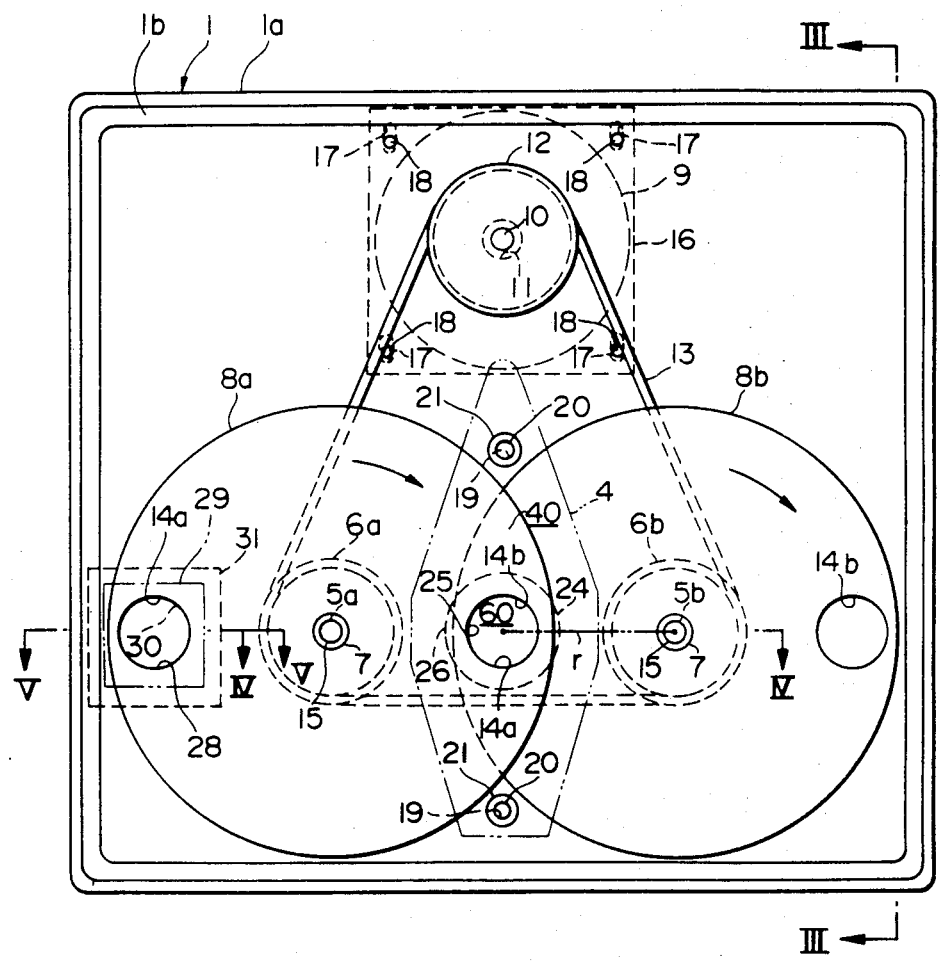
FIG. 2 is an enlarged rear view of a shutter according to the present invention, in which a rear closure plate is removed.
Figure 3:
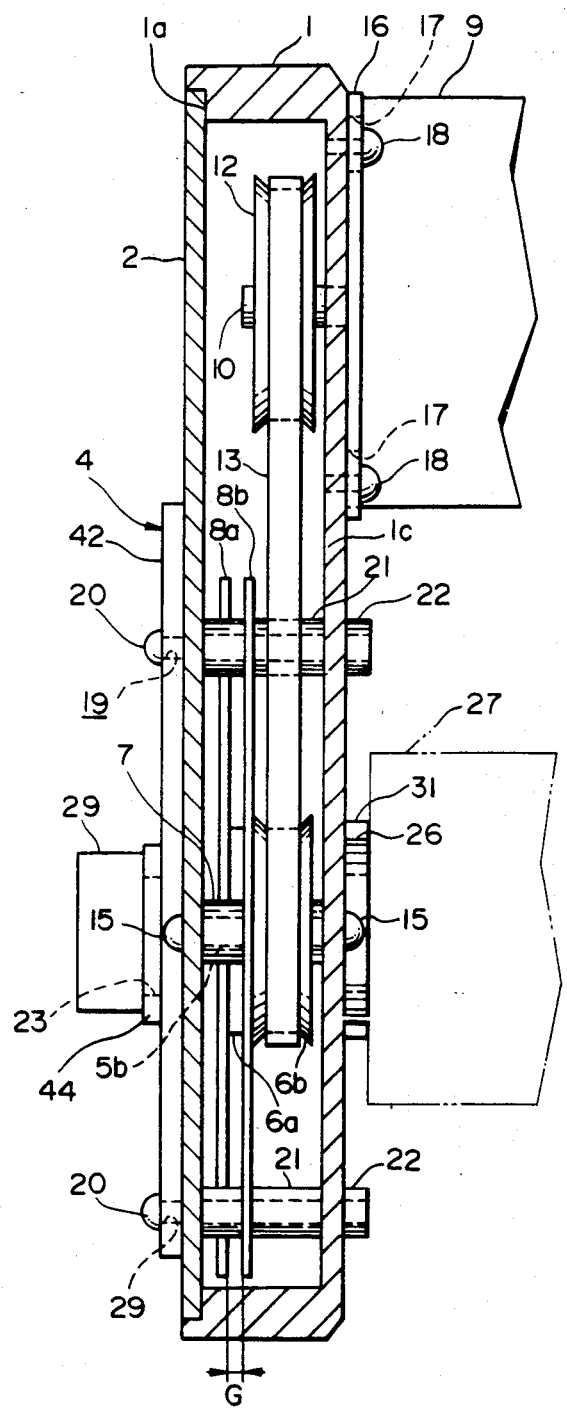
FIG. 3 is an enlarged sectional view taken along the line III—III in FIG. 2.

Referring now to FIGS. 2 to 7, there is illustrated a television camera shutter according to the present invention, in which the reference numeral 1 designates a flat rectilinear box-shaped casing which has an open rear end 1a having a continuous shoulder 1b formed in it. A square rear closure plate 2 is fitted in the shoulder 1b as shown in FIG. 3. The closure plate 2 is provided at a portion near the center thereof with an opening 3 (FIG. 4). A camera mount 4 having a central round through hole 23 is attached to the outer face of the closure plate 2 so that the hole 23 is aligned or concentric with the opening 3, the hole 23 having an equal diameter to the opening 3. The casing 1 has a pair of supporting shafts 5a and 5b erected at a predetermined distance on its bottom to project rearward. The supporting shafts 5a and 5b rotatably support pulleys 6a and 6b having an equal diameter on them through ball bearings 7 and 7, respectively. The pulleys 6a and 6b are supported on the bearings 7 and 7 at different levels as clearly shown in FIG. 4 and have rotation discs 8a and 8b having an equal diameter and concentrically secured to their respective rear faces. The circular discs 8a and 8b are designed to overlap at their peripheries at 40 (FIG. 2) with a gap G. The casing 1 is provided on its front face with a synchronous motor 9 of which rotation shaft 10 passes through a hole 11 formed through the front wall 1c of the casing 1 and vertically and inwardly projects from the inner face of the front wall 1c. The rotation shaft 10 has another pulley 12 mounted on its distal end. The axes of rotation shaft 10 and the supporting shafts 5a and 5b are disposed to be at apexes of a triangle as shown in FIG. 2. An endless belt 13 extends around the three pulleys 6a, 6b and 12 to form a substantially isosceles triangle. Preferably, a timing belt is used as the belt 13 and meshes with timing belt pulleys in place of the pulleys 6a and 6b. Each of the rotating discs 8a and 8b has a pair of circular shutter holes 14a and 14a or 14b and 14b which have an equal diameter and symmetrically formed through it with respect to the axis thereof so that corresponding shutter holes 14a and 14b are aligned with the opening 3 of the closure plate 2 at the overlapping area 40 of the rotation discs 8a and 8b as the discs 8a and 8b rotate. The rear ends of the supporting shafts 5a and 5b abut against the inner face of the closure plate 2 and are fastened there by machine screws 15 and 15.

The synchronous motor 9 is fixed to a square mounting plate 16 which has a slot 17 formed through each corner thereof to extend vertically and the mounting plate 16 is secured to the front face of the front wall 1a of the casing 1 by a machine screw 18 passing through each slot 17, so that the vertical position of the rotation shaft 10 of the synchronous motor 9 may be adjusted by changing the position of the mounting plate 16 with respect to the casing 1.

The camera mount 4 includes a base plate 42 and a camera joint 44 fixed to the outer face of the central portion of the base plate 42. The opening 23 of the camera mount 4 passes through both the base plate 42 and the camera joint 44. The base plate 42 is provided at its upper and lower end portions with through holes 19 and 29, respectively, through each of which a bolt 20 passes. Each bolt 20 further passes through the closure plate 2, a spacer 21 and the front wall 1c of the casing 1 and engages at it distal end with a nut 22, thus mounting the camera mount 4 to the casing 1. The front wall 1c of the casing 1 has an opening 25 having a diameter substantially equal to the diameter of the opening 3 of the closure plate 2 and located to be concentric with the opening 3. A lens joint ring 26 is fixed to the outer face of the front wall 1c of the casing 1 to be concentric with the opening 25, the inner diameter of the ring 26 being substantially equal to the diameter of the opening 25.

The closure plate 2 is provided near its one corner with an opening 28 so that the opening 28 is aligned with one of the shutter holes 14a and 14a as shown in FIG. 5 when the other shutter hole 14a is aligned with the openings 3 and 25. A light emitting section 32 of a photodetector 29 is mounted on the outer face of the closure plate 2 to close the opening 28. On the other hand, the casing 1 has an opening 30 formed through its front wall 1c so as to be concentric with the opening 28 when the closure plate 2 is fitted in the casing 1. A light receiving section 31 of the photodetector 29 is mounted on the outer face of the front wall 1c of the casing 1 so as to cover the opening 30. In this embodiment, the light-emitting diode and photodiode are used in the light emitting section 32 and the light receiving section 31, respectively.

In operation, the synchronous motor 9 is energized, thereby rotating the pulley 12, which in turn rotates via the belt 13 the pulleys 6a and 6b in the same direction, for example clockwise direction as shown by the arrows in FIG. 2, at the same speed. Thus, the rotation discs 8a and 8b which are respectively fixed to the pulleys 6a and 6b rotate at an equal speed and in the same direction, so that shutter holes 14a and 14b are brought in alignment with the openings 3 and 25 for every 180° rotation of the rotation discs 8a and 8b as shown in FIG. 2. At this moment, the other shutter hole 14a of one disc 8a is aligned with the openings 28 and 30, so that light emitted from the light emitting section 32 passes the other shutter hole 14a and enters the light receiving section 31, of which light receiving element not shown converts the incident light to an electric signal, by which the release of the shutter is detected. This electric signal is compared with a vertical drive signal from a drive circuit 102 of the television camera tube in a comparing circuit 104 (FIG. 7). When a phase shift between the releasing of the shutter and the vertical drive signal is detected, alternating current supplied from a power source 106 to the synchronous motor 9 is adjusted in phase by a conventional control unit 108 so that the release of the shutter is synchronized with the field scanning of the television camera. The light from the lens which is mounted on the lens mount 26 passes through the shutter into the television camera 50, which is mounted on the camera body mount 4, only while the corresponding shutter holes 14a and 14b form a shutter opening 60 (FIG. 2). Consequently, an optical image is projected on the photoelectric surface of the television camera tube for a very short period of time for each field and electronically stored in it and then converted to electric signals for a field. Thus, a clear picture with little blurring is produced.

In an example, a television camera shutter having a shutter speed of 1/500 sec. was built, having the same structure as the shutter in FIGS. 2 to 7. The distance r, as shown by the phantom line in FIG. 2, between the center of each of rotation discs 8a and 8b and the center of corresponding shutter hole 14a or 14b was 53 mm and the diameter D of each of shutter holes 14a and 14b was 20 mm. The rotation discs 8a and 8b were rotated at a speed of 30 revolutions per second. Hence, it took 1/30 sec for one revolution of the rotation discs. The shutter speed S was calculated by the following formula:

$$S = (1/30 \text{ sec.}) \times (D/2\pi r)$$

$$\simeq 0.00200 \text{ (/sec.)}$$

Figure 8:
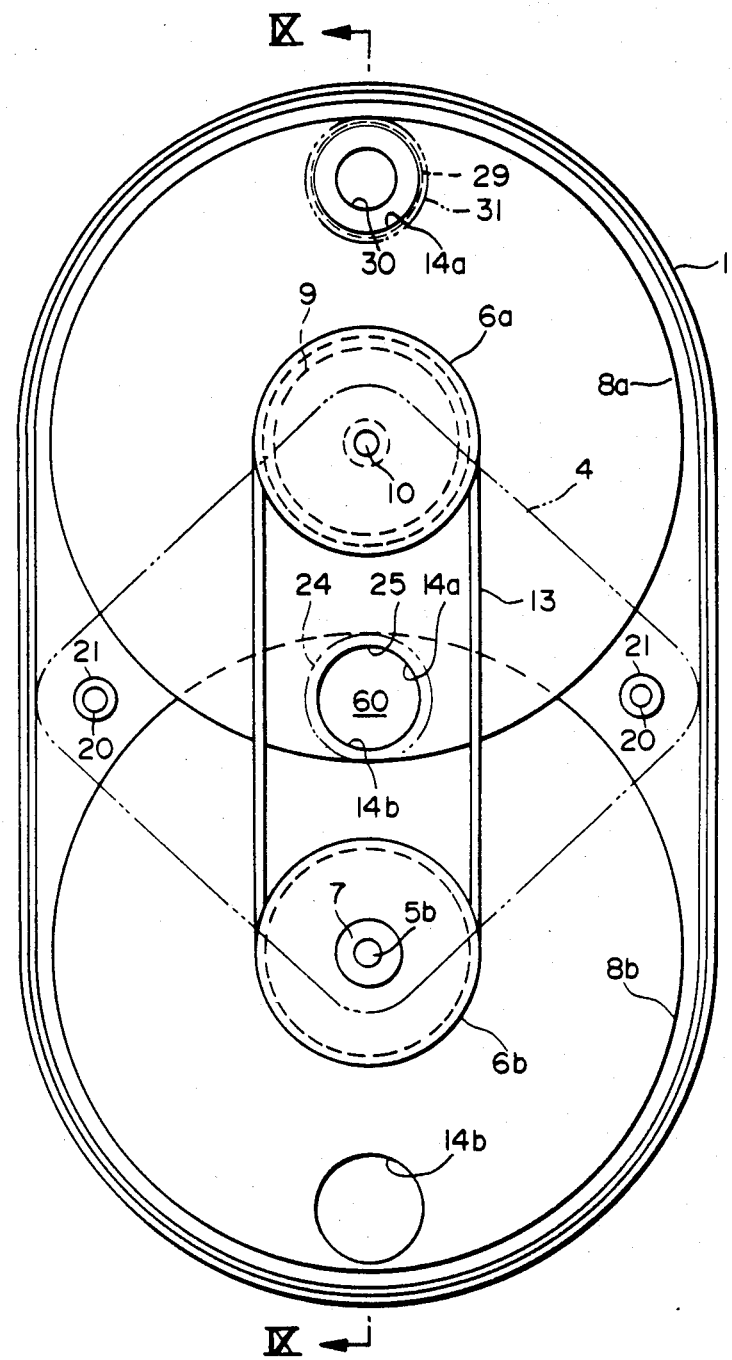
FIG. 8 is a rear view of a second embodiment of the present invention, in which a rear closure plate is removed.
Figure 9:
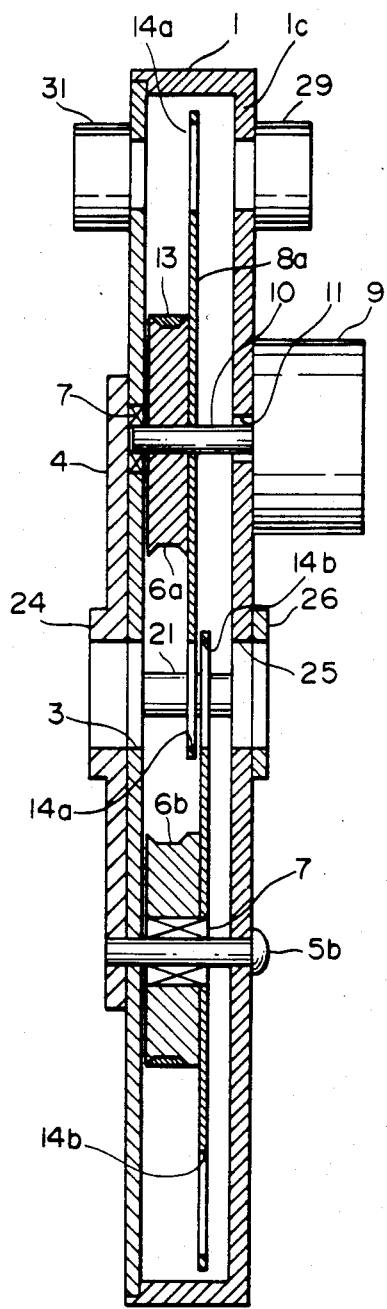
FIG. 9 is a sectional view taken along the line IX—IX in FIG. 8.

FIGS. 8 and 9 illustrate a second embodiment of the present invention, in which similar parts to the parts of the preceding embodiment are designated by like reference numerals and explanations thereof are omitted. This embodiment is essentially distinct from the first embodiment in that two pulleys 6a and 6b are used instead of three pulleys 6a, 6b and 12. One pulley 6a is mounted on the rotation shaft 10 of synchronous motor 9 and connected to the other pulley 6b via belt 13. Thus, the casing 1 is reduced in size and weight. In this embodiment, the casing 1 has an ellipsoidal shape in its front view.

In place of the belt and pulley transmission, toothed wheel transmission may be adopted, in which case the shutter may be made thin as compared to the preceding embodiments using the belt 13 and the pulleys 6a and 6b since toothed wheels may be formed thinner than pulleys.

While the invention has been disclosed in specific details for purposes of clarity and complete disclosure, the appended claims are intended to include within their meaning all modifications and changes that come within the true scope of the invention as defined therein.

What is claimed is:

1. A shutter for use in a television camera, comprising:
    a casing having a first wall having a first opening formed therethrough for allowing incident light from a lens of the television camera to pass through the first opening and a second wall opposingly disposed to the first wall and having a second opening aligned to the first opening for allowing the incident light to pass through the second opening into a body of the television camera;
    a first disc member supported within the casing to be rotatable about an axis thereof and in parallel with the first and the second walls, the first disc member having a first shutter hole formed therethrough;
    a second disc member supported within the casing to be rotatable about an axis thereof and in parallel with the first and the second walls, the second disc member having a second shutter hole formed therethrough, the first disc member and the second disc member being disposed to overlap at overlapping areas at peripheries thereof with a gap, the first and second shutter holes formed to be aligned to each other and to the first and second openings at the overlapping areas to define a shutter opening when the first and second disc members rotate;
    rotating means, mounted on the casing, for rotating the first and the second disc members in the same direction; and
    controlling means for controlling the rotating means to thereby control the rotation of the first and the second disc members so that the forming of the shutter opening is synchronized with a field scanning of the television camera, whereby the incident light is allowed to pass through the first opening, the shutter opening and the second opening in synchronism with the field scanning of the television camera.

2. A shutter as recited in claim 1, wherein the rotating means comprises: an electric motor having an output shaft; a first rotation shaft coaxially fixed to the first disc member and rotatably supported on the casing; a first pulley member mounted on the first rotation shaft; a second pulley member mounted on the output shaft; and an endless belt member extending around the first pulley member and the second pulley member so as to transmit rotation of the output shaft to the first rotation shaft, and wherein the second disc member is mounted around the output shaft of the electric motor.

3. A shutter as recited in claim 1, wherein the rotation means comprises: an electric motor having an output shaft; a first rotation shaft coaxially fixed to the first disc member and rotatably supported on the casing; a first pulley member mounted on the first rotation shaft; a second pulley member mounted on the output shaft; a third rotation shaft coaxially fixed to the second disc member and rotatably supported on the casing; a third pulley member mounted on the third rotation shaft; and an endless belt member extending around the first pulley member, the second pulley member and the third pulley member so as to transmit rotation of the output shaft to the first rotation shaft and the third rotation shaft.

4. A shutter as recited in claim 3, wherein the electric motor is a synchronous motor.

5. A shutter as recited in claim 4, wherein the controlling means comprises means for defining a sensing hole formed through the first disc member and a photodetector, mounted on the casing, for detecting the sensing hole by passing sensor light through the sensing hole to thereby detect the alignment of the first shutter hole and the second shutter hole.

6. A shutter as recited in claim 5, wherein: the first disc member comprises another first shutter hole, the two first shutter holes being disposed to be symmetric with respect to the axis of the first disc member; and the second disc member comprises another second shutter hole, the two second shutter holes being disposed to be symmetric with respect to the axis of the second disc member, and wherein the sensing hole is one of the first shutter hole when the other first shutter hole is aligned with one of the second shutter holes.

* * * * *